United States Patent [19]

d'Alayer de Costemore d'Arc

[11] Patent Number: 4,675,858
[45] Date of Patent: Jun. 23, 1987

[54] OBTURATING DOOR FOR SLOT-TYPE PLAYBACK AND/OR RECORDING APPARATUS

[75] Inventor: Stéphane A. M. d'Alayer de Costemore d'Arc, Genappe, Belgium

[73] Assignee: Staar S.A., Brussels, Belgium

[21] Appl. No.: 753,932

[22] Filed: Jul. 11, 1985

[30] Foreign Application Priority Data

Nov. 26, 1984 [BE] Belgium ............................ 0/214.059

[51] Int. Cl.⁴ ...................... G11B 17/04; E05D 15/50; A47B 95/00
[52] U.S. Cl. ......................................... 369/77.1; 16/2; 16/231; 16/287; 49/192; 312/319
[58] Field of Search ................ 369/77.1, 77.2; 16/231, 16/232, 281, 282, 287, 302, 366, DIG. 23; 49/192; 312/319

[56] References Cited

U.S. PATENT DOCUMENTS

| | | | |
|---|---|---|---|
| 691,551 | 1/1902 | Kincaid | 16/282 |
| 901,796 | 10/1908 | Erickson | 16/281 |
| 2,117,148 | 5/1938 | Clark | 16/281 |
| 4,454,599 | 6/1984 | Tsuchiya | 369/77.2 |
| 4,467,466 | 8/1984 | Hughes | 369/77.2 |

FOREIGN PATENT DOCUMENTS

| | | |
|---|---|---|
| 2918003 | 11/1979 | Fed. Rep. of Germany . |
| 376838 | 3/1949 | Italy ..................... 16/281 |

*Primary Examiner*—Steven L. Stephan
*Attorney, Agent, or Firm*—Leydig, Voit & Mayer

[57] ABSTRACT

A slot-loading apparatus for a playback and/or recording device comprising a front panel having a slot defining a path for inserting and ejecting a record element and a door operated responsive to the insertion and ejection of the element. The angle and height of insertion are independently controlled by providing a door unit having a curved section facing a curved portion of the slot in the front panel. The movement of the door relative to the slot can be effectively utilized to provide light indicators for the apparatus.

8 Claims, 11 Drawing Figures

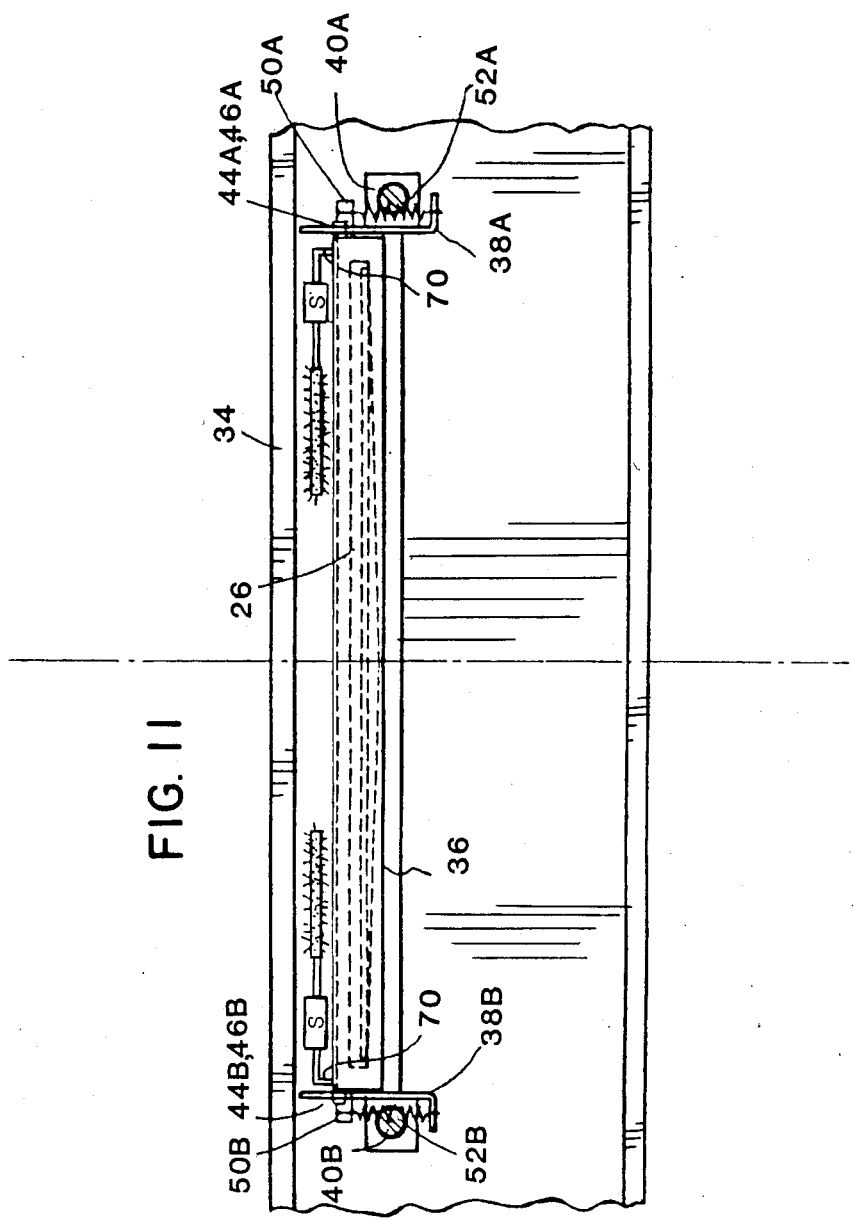

OBTURATING DOOR FOR SLOT-TYPE PLAYBACK AND/OR RECORDING APPARATUS

TECHNICAL FIELD

The present invention relates to playback and/or recording apparatus and, in particular, apparatus of the slot-loading type having a pivotable door, such as turntables, cassette players and eight track players.

BACKGROUND ART

In general, slot-loading type playback and/or recording devices are widely used where convenient loading is desired or space is limited and compact design and construction are necessary. For example, playback devices used in automobiles are desirably of slot-loading types because only a limited space is available. Furthermore, the slot-loading type devices usually require less attention in loading or unloading and are correspondingly less distracting. Accordingly, various slot-loading apparatus have been introduced commercially. However, as can be easily recognized, slot-loading apparatus of the type suited for cassettes may not be suitable for turntables and discs.

DISCLOSURE OF INVENTION

It is, therefore, a main object of the present invention to eliminate drawbacks of the known slot-loading type playback and/or recording apparatus by providing a simple and reliable means for obturating the slot of the apparatus, both in operative and inoperative positions.

Another object of the present invention is to provide a slot-door which is opened upon engagement by a disc when moved through the slot in either direction, insertion or ejection.

A further object of the present invention is to provide a door unit through which a disc may be inserted at different angles of insertion.

Still another object of the present invention is to provide indicators energized by movement of the door unit with respect to the slot of the apparatus.

BRIEF DESCRIPTION OF THE DRAWINGS

With the above and other objects in view, reference will now be had to the accompanying drawings, wherein.

BEST MODE FOR CARRYING OUT THE INVENTION

Figure 1:
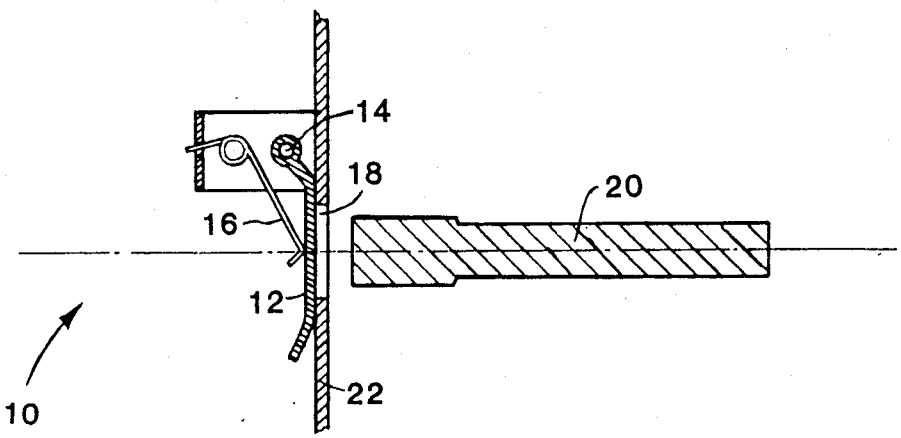
FIGS. 1 and 2 are sectional view of a prior art apparatus in an inoperative and an operative mode, respectively.
Figure 2:
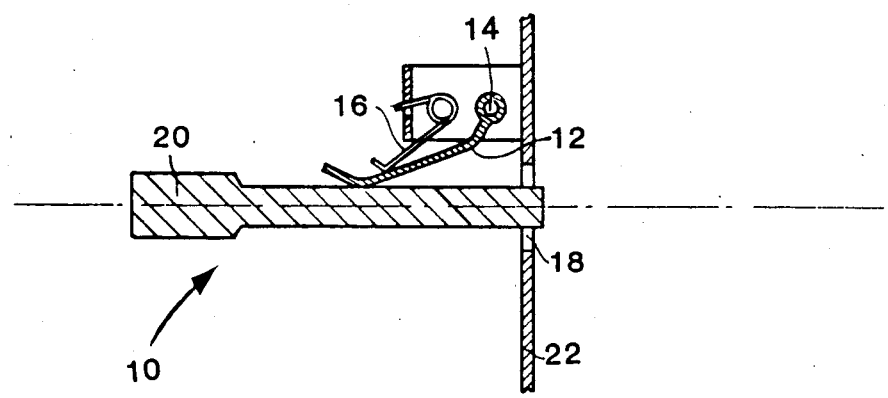

Referring to FIGS. 1 and 2, a slot-loading apparatus, shown herein as a cassette player 10, has door 12 pivoting in only one direction around a fixed axis 14 on which spring means 16 are acting on the door 12 for closing a slot 18 of the cassette player 10.

FIG. 1 shows the positions of the door 12 and spring means when a tape cassette 20 is opposite the slot 18 before insertion into the cassette player 10. As can be seen, the door 12 lies against a front panel 22 to block the slot 18.

When the tape cassette 20 is inserted into the player 10, as shown in FIG. 2, the door 12 pivots against the spring means 16 and rests on the cassette 20. In this position, the door 12 does not interfere with the tape within the cassette 20 and the cassette player 10 is in its operative mode. Also, it is clearly seen that this type of apparatus is not recommended for video cassette players since spring means 16 will act on the cassette and pressure on the tape will build up during recording or playback.

Figure 3:
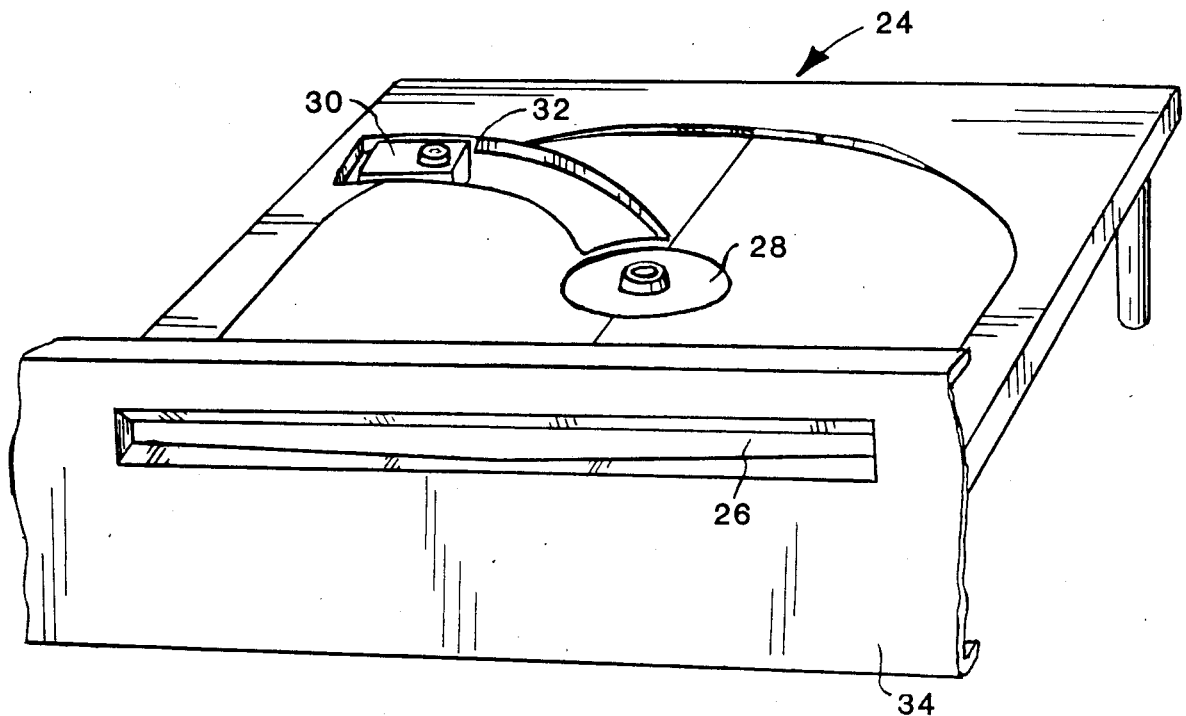
FIG. 3 is a perspective view of turntable having a slot-loading apparatus according to a preferred embodiment of the present invention.

Referring now to FIG. 3, there is shown a turntable 24 of the type equipped with laser beam playback/recording means for compact disc (CD) records. The turntable 24 includes a front panel 22 having a slot 26 defining a path through which a disc is inserted to a position over a drive hub 28 and through which the disc may be ejected from the drive hub 28. A moving assembly 30 carrying the laser beam playback/recording means 32 is movable radially to scan the disc as it is rotated by the hub 28.

Figure 4:
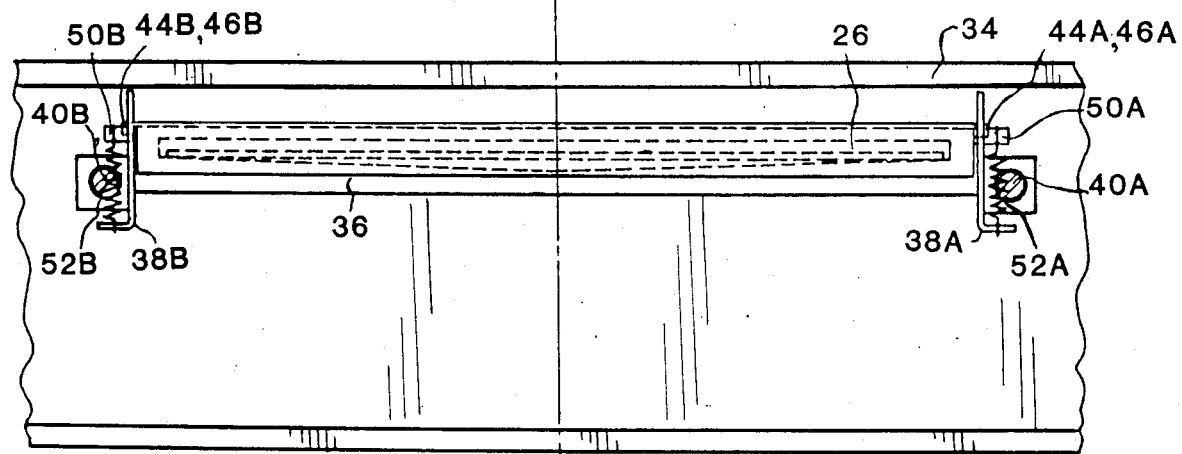
FIG. 4 is a back view of the slot of the slot-loading apparatus of FIG. 3.
Figure 5:
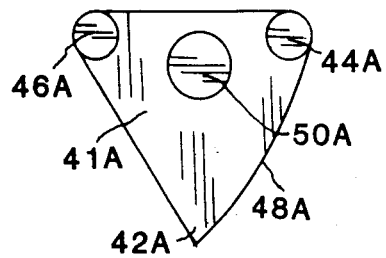
FIG. 5 is an enlarged view illustrating the end of the door.

FIG. 4 is a back view of the panel 22 with a door unit according to the invention. As can be seen, there is shown a door 36 adjacent the slot 26 and supported by a pair of lateral supports 38A and 38B on the sides. These lateral supports 38A and 38B are mounted directly to the back of the panel 22 by a pair of screws 40A and 40B. The door 36 is an oblong element, preferably molded plastic, having an approximately triangular-shaped cross-section (shown in FIG. 5) with one apex at the bottom and a pair of pivots 44A, 46A or 44B, 46B on each lateral side extending from the other apexes at the extremities of the oblong element. In the middle of the ends between the pivots 44A, 46A and 44B, 46B, respectively, means are provided, herein shown as projections 50A or 50B and a pair of springs 52A and 52B, to constrain the door 36 to the lateral supports 38A and 38B. The tension of the springs 52A and 52B keeps the door 36 obturating, i.e., blocking the slot 26 before and after the insertion or ejection of a disc.

Figure 6:
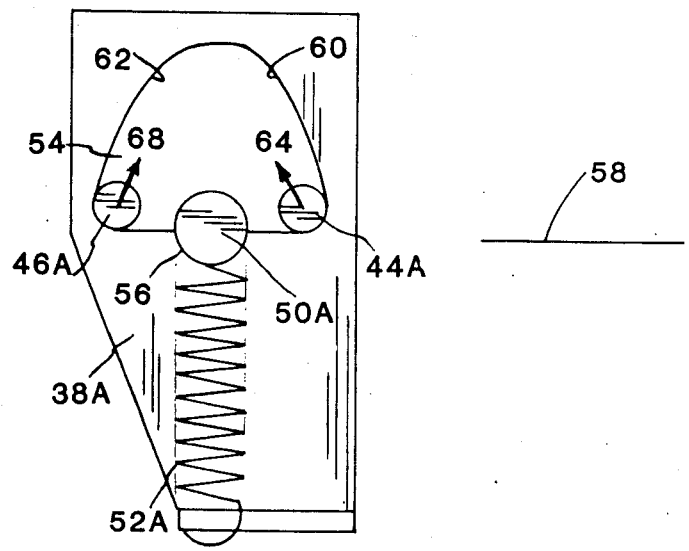
FIG. 6 is an enlarged fragmentary view illustrating one lateral support for the door.

One of the lateral supports 38A is shown in FIG. 6. In this Figure, numeral 54 denotes a rounded, triangular-shaped cut having a recess 56 in the middle of the bottom side for receiving and supporting one of the projections 50A of the door 36. On both sides of the recess 56 the pivots 44A, 46A of the door 36 extend through the cut 54, allowing the door 36 to pivot around either of the two axes lying in a plane substantially parallel to the insertion or ejection plane (indicated by a horizontal line 58). The cut 54 guides the ascension movement of one pivot 44A along curve 60 while the pivot 46A remains fixed and the door 36 pivots around the axis of the pivot 44A, and similarly the cut guides the ascension of pivot 46A along curve 62 while the pivot 46A remains fixed and the door 36 pivots around the axis of pivot 46A. These movements are illustrated by arrows 64 and 68, respectively.

Figure 7:
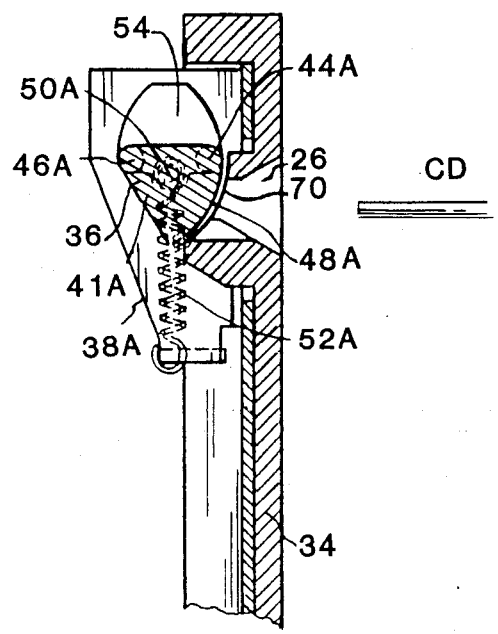
FIGS. 7–10 are lateral sectional views of a slot-loading apparatus before and during insertion and before and during ejection, respectively.

A lateral sectional view of the apparatus 34 before a record element such as a disc is inserted is shown in FIG. 7. In this closed-door position, the spring 52A pulls down the door 36 via element 50A. The pivots 44A, 46A remain in a horizontal plane and are supported by the lateral support 38A. The pivots 44A, 44B, 46A, 46B are in a plane substantially normal to the vertical plane of the slot in the closed position of the door and move out of that plane as the door is opened.

Figure 8:
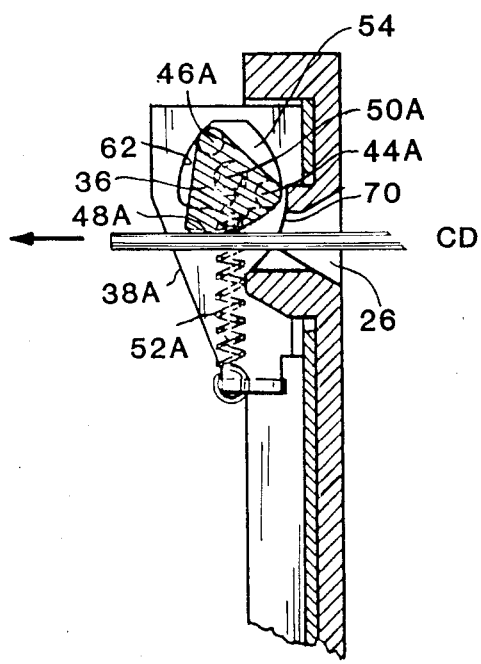
Figure 9:
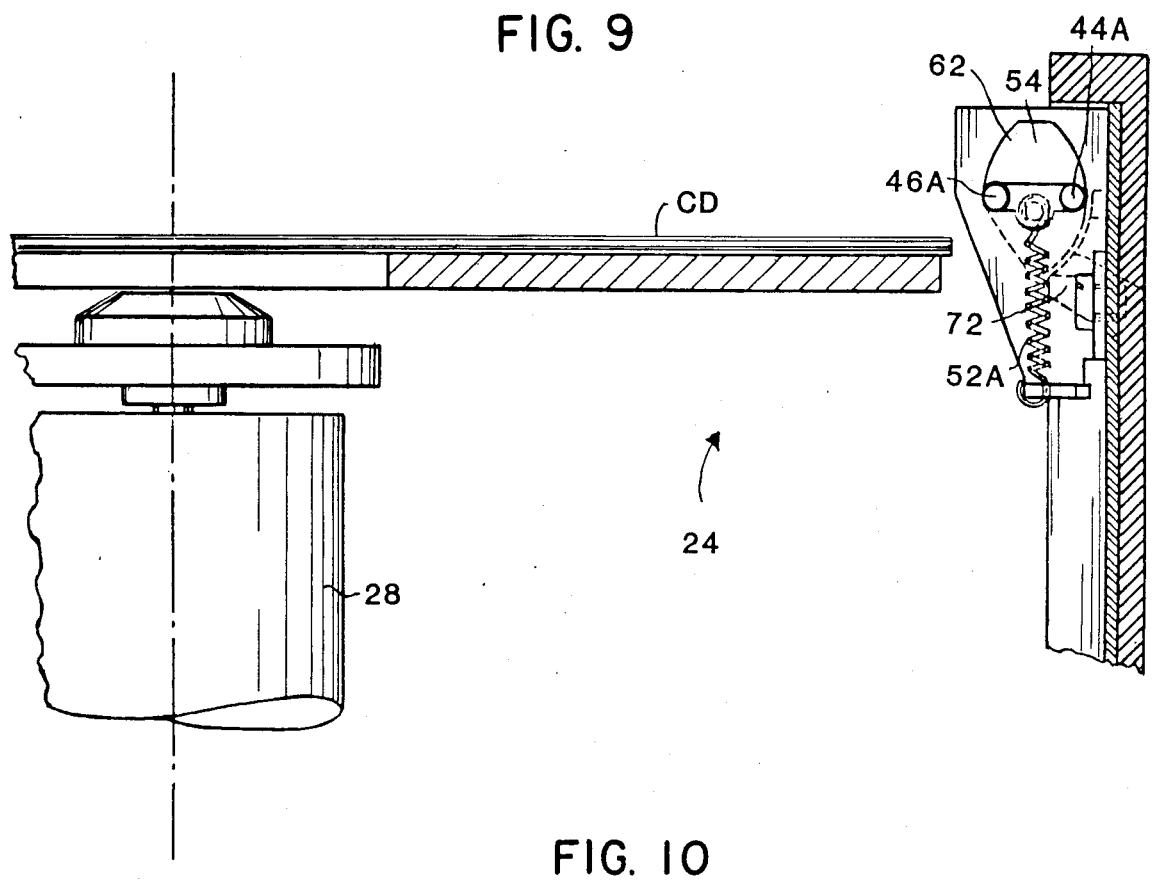

As the disc is inserted by the user, as illustrated in FIG. 8, the periphery of the disc engages a curved side 48 of the triangular door 36. This side is curved and the upper and lower edges of the slot diverge so that the disc may be inserted at different angles and heights and still operate the door 36. The door 36 pivots around pivot 44A which remains fixed and is guided by the ascension movement of pivot 46A along the curve 62 of the cut 54. The door 36 is held in its raised position as long as the curved side 48 of the door 36 is in contact with the disc until the disc clears the door. At this instant, as shown in FIG. 9, the door 36, under the pulling action of the springs 52A and 52B on the other side, pivots around pivot 44A and is guided by the descending movement of pivot 46A along the same curve 62 of the cut 54 to return to the position before the disc is inserted. In this position, the door 36 may be locked to prevent introduction of another disc or any other object by means such as a lug 72 carried by the loading device 24 and abutting the flat top of the triangular cross-section door 36.

Figure 10:
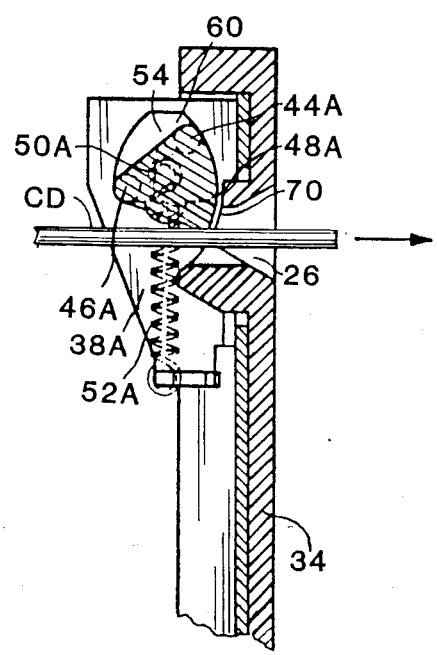

Referring now to FIG. 10, a lateral sectional view of the apparatus 34 when ejection is performed, the periphery of the disc is shown pressing one of the straight sides of the door 36. This action pushes the door 36 upwardly but the door 36 now pivots around the pivot 46A, which remains fixed, and is guided by the ascension movement of the pivot 44A along the curve 60 of the cut 54. The door 36 will be held in its raised position until the disc is no longer in contact with the door 36 and is completely outside the slot 26. Again, under the pulling influence of the spring 52A (and 52B on the other side), the door 36 pivots around pivot 46A and descends along the same curve 60 of the cut 54 to return to a closed-door position wherein the curved section 48A of the door 36 abuts the curved portion 70 of the apparatus 34 to obturate the slot 26.

It should be noted that, during both the insertion and ejection operations, the door 36 always pivotally sweeps the same area of the cut 54 to ensure an efficient obturation before and after insertion or ejection. This is achieved by allowing only the pivot furthest from the disc to pivotally move along a curve of the cut 54 while the pivot that is closer to the disc remains fixed. Clearly, by having the same displacement area, there is no requirement for an adjustment mechanism that is usually necessary when the displacement of both pivots exists.

In accordance with a further aspect of the invention, illumination of the slot 26 is provided. The pivots and their movements may advantageously be used to activate switches to power on or off the lighting of the slot 36 in the presence or absence of a disc. Such switches may also be powered by the loading mechanism according to the operative or inoperative position of the door 36.

I claim:

1. A slot-loading apparatus for a playback and/or recording device for a record, said apparatus comprising:
   (a) a front panel having a slot defining a path through which a record may be inserted into or ejected from said device;
   (b) a door pivotally mounted behind said front panel adjacent said slot and in said path to be opened upon insertion or ejection of said record and obturating said path through said slot while said device is operative or inoperative, said door comprising an oblong element having an approximately triangular cross-section with an apex at a bottom portion of the slot and a pair of support pivots located at the other apexes of said door element at extremities thereof and adjacent a top portion of the slot; and
   (c) supporting means for pivotally supporting said door support pivots so that said door element is pivotable around either of two axes lying in a plane substantially parallel to said path, and said door may be opened by engagement by said record upon either insertion through said slot into said device or ejection from said device through said slot.

2. A slot-loading apparatus according to claim 1 in which said door has a curved side facing said slot to accommodate different inserting heights and angles.

3. A slot-loading apparatus according to claim 1 wherein said door element pivots around one of said axes while displacing a circular arc along the other of said axes to maintain the same displacement area in both insertion and ejection operations.

4. A slot-loading apparatus according to claim 3 wherein said door element pivots around one of said axes during insertion and pivots around the other of said axes during ejection.

5. A slot-loading apparatus according to claim 1 in which said door element further includes means located between said pivots for attaching springs to said supporting means to maintain said pivoting axes during insertion or ejection and to obturate said slot otherwise.

6. A slot-loading apparatus according to claim 1 wherein said supporting means includes rounded triangular cuts for guiding rotational movement of said pivots during insertion or ejection of said element.

7. A slot-loading apparatus according to claim 1 in which said supporting means includes lateral side supports having openings providing surfaces cooperating with said pivots to support the door for pivotal movement about either of said pair of pivots.

8. A slot-loading apparatus for a playback and/or recording device for a record, said apparatus comprising:
   (a) a front panel having a slot defining a path through which a record may be inserted into or ejected from said device;
   (b) a door pivotally mounted behind said front panel adjacent said slot including an oblong element having a pair of spaced pivots at extremities thereof, said door being mounted in said path to be opened upon insertion or ejection of said record and obturating said path through said slot while said device is operative or inoperative; and
   (c) supporting means for pivotally supporting said door to be opened by pivotal movement out of said path upon engagement by said record upon either insertion through said slot into said device or ejection from said device through said slot including lateral side supports having openings providing surfaces cooperating with said pivots to support the door for pivotal movement about either of said pair of pivots, one of said pivots supporting said door element for inward pivotal movement out of the path upon insertion of said record and the other of said pivots supporting said door element for outward pivotal movement out of the path upon ejection of said record.

* * * * *